US007847796B2

(12) United States Patent
Shin et al.

(10) Patent No.: US 7,847,796 B2
(45) Date of Patent: Dec. 7, 2010

(54) DISPLAY DEVICE AND DRIVING METHOD WITH A SCANNING DRIVER UTILIZING PLURAL TURN-OFF VOLTAGES

(75) Inventors: Kyoung-Ju Shin, Yongin-si (KR); Cheol-Woo Park, Suwon-si (KR); Sung-Jin Hong, Seoul (KR); Chong-Chul Chai, Seoul (KR)

(73) Assignee: Samsung Electronics Co., Ltd. (KR)

( * ) Notice: Subject to any disclaimer, the term of this patent is extended or adjusted under 35 U.S.C. 154(b) by 813 days.

(21) Appl. No.: 11/560,622

(22) Filed: Nov. 16, 2006

(65) Prior Publication Data

US 2007/0115244 A1 May 24, 2007

(30) Foreign Application Priority Data

Nov. 22, 2005 (KR) ..................... 10-2005-0111726

(51) Int. Cl.
*G06F 3/038* (2006.01)
*G09G 3/30* (2006.01)
*G09G 3/32* (2006.01)

(52) U.S. Cl. ........................... 345/210; 345/79; 345/82

(58) Field of Classification Search ................... 345/36, 345/39, 44–46, 76–83, 87–104, 208–210; 315/169.3; 313/463, 504
See application file for complete search history.

(56) References Cited

U.S. PATENT DOCUMENTS

| | | | | |
|---|---|---|---|---|
| 5,506,598 | A * | 4/1996 | Shimada et al. | 345/92 |
| 6,005,542 | A * | 12/1999 | Yoon | 345/92 |
| 6,307,322 | B1 | 10/2001 | Dawson et al. | |
| 6,809,481 | B2 * | 10/2004 | Seo et al. | 315/169.1 |
| 7,042,426 | B2 * | 5/2006 | Shin | 345/76 |
| 7,262,751 | B2 * | 8/2007 | Chung et al. | 345/76 |
| 2003/0052614 | A1 * | 3/2003 | Howard | 315/169.1 |
| 2003/0210212 | A1 | 11/2003 | Li et al. | |
| 2006/0038756 | A1 * | 2/2006 | Bae et al. | 345/76 |

FOREIGN PATENT DOCUMENTS

| | | |
|---|---|---|
| JP | 2002169510 | 6/2002 |
| JP | 2002207451 | 7/2002 |
| JP | 2004117921 | 4/2004 |
| JP | 2004157467 | 6/2004 |
| JP | 2005017438 | 1/2005 |
| JP | 2005092188 | 4/2005 |
| JP | 2005128361 | 5/2005 |
| JP | 2005189387 | 7/2005 |
| JP | 2005195756 | 7/2005 |
| KR | 1020040025816 | 3/2004 |
| KR | 1020050031951 | 4/2005 |
| KR | 1020050070342 | 7/2005 |

* cited by examiner

*Primary Examiner*—Bipin Shalwala
*Assistant Examiner*—Keith Crawley
(74) *Attorney, Agent, or Firm*—Cantor Colburn LLP

(57) ABSTRACT

A display device includes a plurality of scanning lines, a plurality of data lines intersecting the scanning lines, a plurality of pixels each of which includes a switching transistor connected to a scanning line and a data line, a driving transistor connected to the switching transistor, and an emitting element connected to the driving transistor, wherein a data driver applies data voltages to the data line, and a scanning driver applies scanning signals each of which has at least three different voltage levels to the scanning line.

24 Claims, 12 Drawing Sheets

DISPLAY DEVICE AND DRIVING METHOD WITH A SCANNING DRIVER UTILIZING PLURAL TURN-OFF VOLTAGES

This application claims priority to Korean Patent Application No. 10-2005-0111726, filed on Nov. 22, 2005, and all the benefits accruing therefrom under 35 U.S.C. § 119, the contents of which in its entirety are herein incorporated by reference.

BACKGROUND OF THE INVENTION (a) Field of the Invention

The present invention relates to a display device and a driving method thereof.

(b) Description of the Related Art

Lightweight and thin personal computers and televisions sets require lightweight and thin display devices. Flat panel displays which satisfying these requirements are being substituted for conventional cathode ray tubes ("CRT").

Flat panel displays used for this purpose include liquid crystal displays ("LCD"), field emission displays ("FED"), organic light emitting diode ("OLED") displays, plasma display panels ("PDP") and various other types of displays.

Generally, an active matrix flat panel display includes a plurality of pixels arranged in a matrix, and it displays images using thin film transistors ("TFTs") to control the luminance of the pixels based on given luminance information.

An OLED display is a self-emissive display device that displays images by electrically exciting a light emitting organic material, and it has low power consumption, a wide viewing angle and fast response time, thereby being advantageous for displaying moving images.

An OLED display may be categorized as a top-emission type display wherein the OLED emits light to an outside through a common electrode. OLED displays may also be categorized as bottom-emission type displays wherein the OLED emits light to an outside through a pixel electrode and an insulating substrate.

A pixel of an OLED display includes an OLED and a driving thin film transistor. The OLED emits light having an intensity that depends on the current driven by the driving TFT, which in turn depends on the threshold voltage of the driving TFT and the voltage between the gate and the source electrodes of the driving TFT.

A TFT may include polysilicon or amorphous silicon. A polysilicon TFT has several advantages, but it also has disadvantages such as the complexity of manufacturing polysilicon, which thereby increases the manufacturing costs. In addition, it is difficult to make a large OLED display employing polysilicon.

On the other hand, an amorphous silicon TFT is easily applicable to a large OLED display and is manufactured by a process with fewer steps than that required for a polysilicon TFT. However, the threshold voltage of the amorphous silicon TFT shifts over time, due to an extended application of a unidirectional voltage to a gate of the TFT. This results in non-uniform current flowing in the OLED, and degraded image quality and a shortened lifetime of the OLED.

Thereby, even though the same data voltages are applied to the driving transistor, output currents from the driving transistors may differ from each other, which causes image degradation of the OLED display. For example, if a first driving transistor has a turn-on voltage that has shifted to 2 volts and a second driving transistor has a turn-on voltage that has shifted to 5 volts an applied voltage of 4 volts would cause the first driving transistor to turn on a first OLED, but the applied voltage would not be sufficient for the second driving transistor to turn on the second OLED. In order to prevent the degradation of the threshold voltage of the driving transistor, it is suggested that a reverse bias voltage be applied to the driving transistor for a predetermined time. The application of a reverse bias voltage will reduce or effectively prevent the degradation due to an extended application of a unidirectional voltage to the gate of the TFT.

When the reverse bias voltage is applied from a data driver through a switching transistor to the driving transistor, a gate-source voltage Vgs of the switching transistor decreases to cause a leakage current, and thereby changes the reverse bias voltage applied to the driving transistor.

BRIEF SUMMARY OF THE INVENTION

An exemplary embodiment of the present invention provides a display device, including a plurality of scanning lines, a plurality of data lines intersecting the scanning lines, a plurality of pixels each of which comprises a switching transistor connected to one of the plurality of scanning lines and one of the plurality of data lines, a driving transistor connected to the switching transistor, and an emitting element connected to the driving transistor, a data driver applies data voltages to the data lines, and a scanning driver applies scanning signals, each having at least three different voltage levels, to the scanning line.

The scanning signals may include a turn-on voltage level which turns on the switching transistor and at least two turn-off voltage levels which turn off the switching transistor.

The data voltages may include a normal data voltage representing a grayscale and a reverse bias voltage which applies a reverse bias to the driving transistor.

The two turn-off voltage levels may include a first turn-off voltage level being applied after the normal data voltage is applied and a second turn-off voltage level being applied after the reverse bias voltage is applied.

The second turn-off voltage level has a lower voltage than the first turn-off voltage level.

The scanning driver may include a shift register for sequentially outputting output signals responsive to a scanning start signal and a clock signal, first and second level shifters supplied with the output signals from the shift register, and an output unit which selectively outputs one of the turn-on voltage, the first turn-off voltage, and the second turn-off voltage from the first level shifter and the second level shifter, wherein at least one of the first level shifter and the second level shifter outputs the turn-on voltage, the first level shifter outputs the first turn-off voltage, and the second level shifter outputs the second turn-off voltage.

The output unit may output the turn-on voltage and the first turn-off voltage output by the first level shifter to correspond to the normal data voltage and output the turn-on voltage and the second turn-off voltage of the second level shifter to correspond to the reverse bias voltage.

The reverse bias voltage may be lower than the normal data voltage.

The data driver may output the normal data voltage and the reverse bias voltage within one frame.

The data driver may output the reverse bias voltage within one frame of a plurality of frames.

The data driver may alternately apply the normal data voltage and the reverse bias voltage to the data lines, and the scanning driver may apply the turn-on voltage level to each of the scanning lines at a different predetermined time.

The pixels may include a first pixel row group supplied with the normal data voltage and a second pixel row group supplied with the reverse bias data voltage.

The normal data voltage and the reverse bias voltage may be alternately applied to the first pixel row group and the second pixel row group every frame.

The first pixel row group may include odd pixel rows and the second pixel row group may include even pixel rows.

Another exemplary embodiment of the present invention provides a display device, which includes a plurality of scanning lines, a plurality of data lines intersecting the scanning lines, a plurality of pixels each of which comprises a switching transistor connected to one of the plurality of scanning lines and one of the plurality of data lines, a driving transistor connected to the switching transistor, and an emitting element connected to the driving transistor, a data driver which alternately applies a normal data voltage and a reverse bias voltage to the data lines, and a scanning driver which applies scanning signals to the scanning lines, wherein the normal data voltage and the reverse bias voltage are applied to each pixel at a different predetermined time.

The scanning driver may apply a first turn-off voltage after the normal data voltage is applied and applies a second turn-off voltage after the reverse bias voltage is applied.

The second turn-off voltage may have a level that is lower than a level of the first turn-off voltage.

The scanning driver may include a first shift register which sequentially outputs a first output signal responsive to a first scanning start signal, a second shift register which sequentially outputs a second output signal responsive to a second scanning start signal, first and second level shifters which are supplied with the first and second output signals from the first and second shift registers, respectively, and an output unit which selectively outputs one of the turn-on voltage, the first turn-off voltage, and the second turn-off voltage from the first level shifter and the second level shifter, wherein at least one of the first level shifter and the second level shifter outputs the turn-on voltage, the first level shifter outputs the first turn-off voltage, and the second level shifter outputs the second turn-off voltage.

The data driver may apply the normal data voltage and the reveres bias voltage to the data lines about every horizontal period, wherein a horizontal period is equal to a period of a horizontal synchronization signal and a data enable signal.

The different predetermined time may be less than about one horizontal period, wherein a horizontal period is equal to a period of a horizontal synchronization signal and a data enable signal.

A time from the application of the normal data voltage to the application of the reverse bias voltage may be longer than a time from the application of the reveres bias voltage to the application of another normal data voltage.

The plurality of pixels is arranged in substantially a matrix shape having rows and columns and normal data voltage may be sequentially applied to every pixel row and the reverse bias voltage may be sequentially applied to every pixel row.

The plurality of pixels is arranged in substantially a matrix shape having rows and columns and the normal data voltage and the reverse bias voltage may be alternately applied to the odd pixel rows and the even pixel rows.

Yet another exemplary embodiment of the present invention provides a driving method of a display device including a plurality of scanning lines, a plurality of data lines, switching transistors connected to the data lines, driving transistors connected to the switching transistors, and emitting elements connected to the driving transistors, the method including applying normal data voltages to the data lines, applying a first turn-on voltage and a first turn-off voltage to the scanning lines, applying reverse bias voltages to the data lines, and applying a second turn-on voltage and a second turn-off voltage to the scanning lines.

The first turn-off voltage may be applied after the normal data voltage is applied, and the second turn-off voltage may be applied after the reverse bias voltage is applied.

The second turnoff voltage may have a voltage level that is lower than a voltage level of the first turn-off voltage.

Still another exemplary embodiment of the present invention provides a driving method of a display device comprising a plurality of pixel rows, a plurality of scanning lines, a plurality of data lines, switching transistors connected to the data lines, driving transistors connected to the switching transistors, and emitting elements connected to the driving transistors, the method including alternately applying a normal data voltage and a reverse bias voltage to the data lines, and applying turn-on voltages to the scanning lines, the turn on voltages being supplied to each scanning line at a different predetermined time, wherein the turn-on voltages are applied when the normal data voltage and the reverse bias voltage are applied, and an entire frame is displayed every time that a normal data voltage and a reverse bias voltage are applied to all of the data lines.

The driving method may further include applying a first turn-off voltage to the scanning line after the normal data voltage is applied, and applying a second turn-off voltage to the scanning line after the reverse bias voltage is applied.

The second turn-off voltage has a voltage level that is lower than a voltage level of the first turn-off voltage.

The driving method may further include alternately applying the normal data voltages and the reverse bias voltages to odd pixel rows and even pixel rows every frame, respectively.

BRIEF DESCRIPTION OF THE DRAWINGS

The present invention will become more apparent by describing preferred embodiments thereof in detail with reference to the accompanying drawings in which.

DETAILED DESCRIPTION OF THE INVENTION

Figure 1:
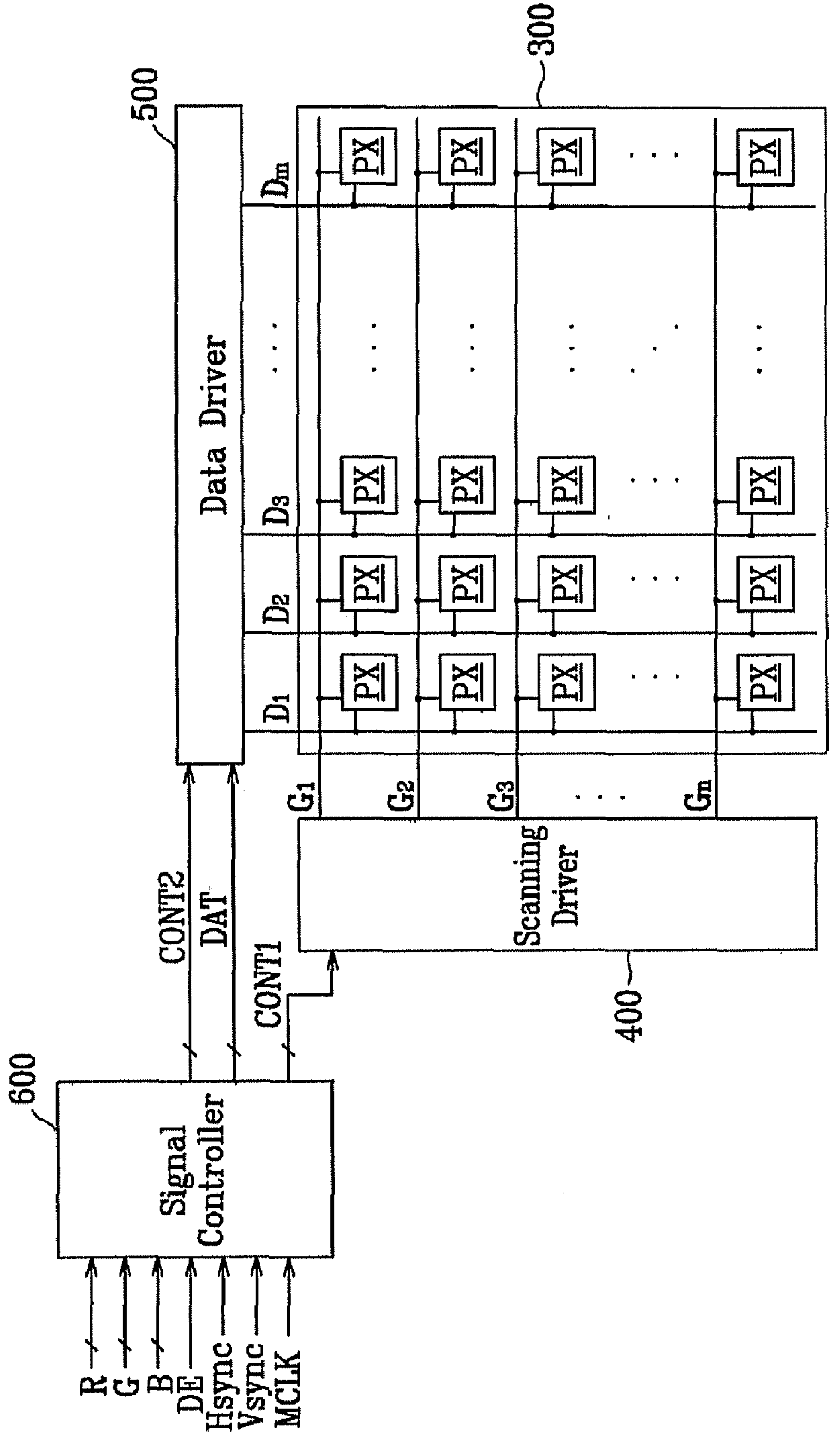
FIG. 1 is a block diagram of an exemplary embodiment of an OLED display according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, S elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Figure 2:
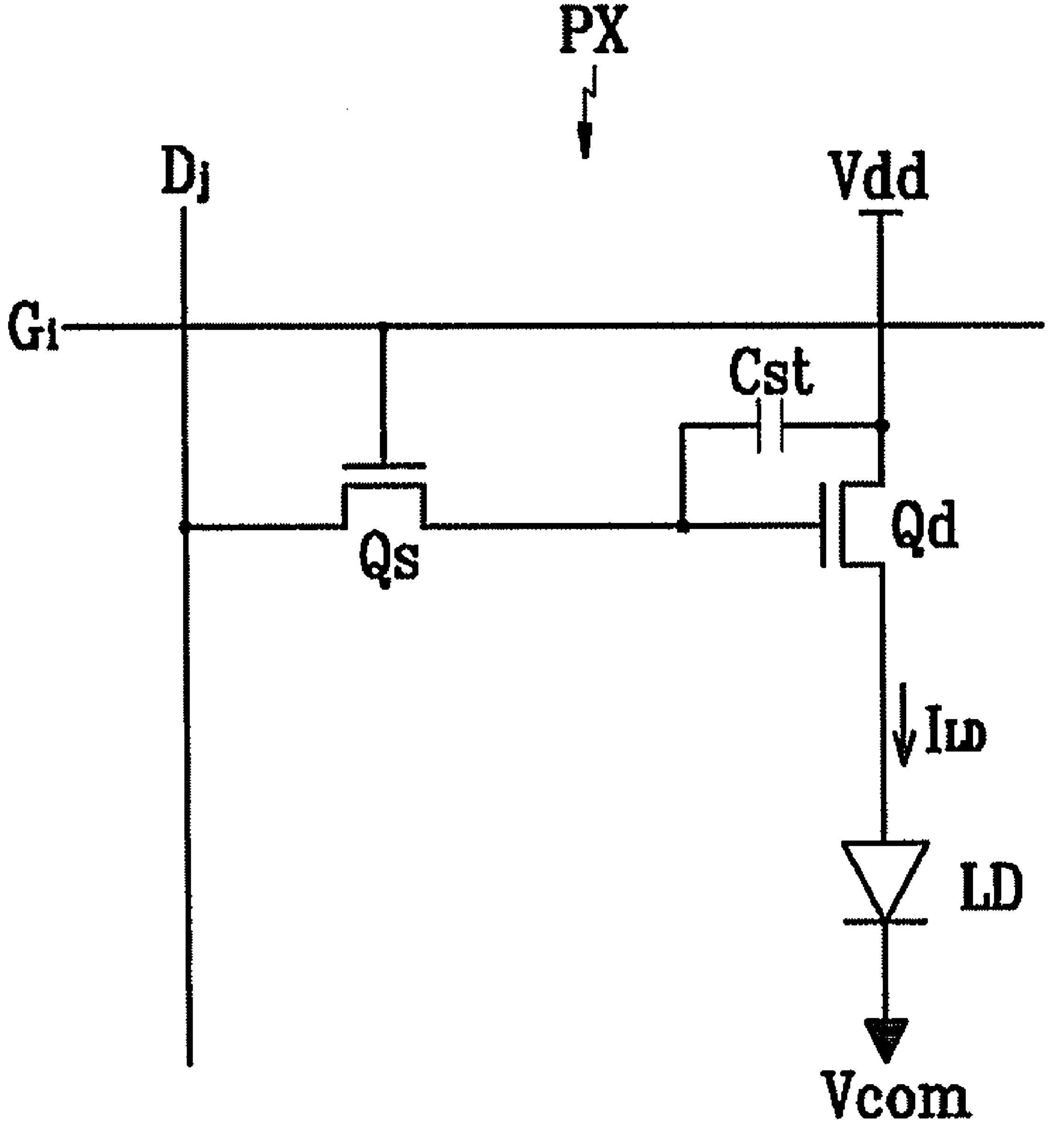
FIG. 2 is an equivalent circuit diagram of an exemplary embodiment of a pixel of an OLED display according to the present invention.

FIG. 1 is a block diagram of an exemplary embodiment of an OLED display according to the present invention, and FIG. 2 is an equivalent circuit diagram of an exemplary embodiment of a pixel of an OLED display according to the present invention.

Referring to FIG. 1, an exemplary embodiment of an OLED display includes a display panel 300, a scanning driver 400 and a data driver 500 that are connected to the display panel 300, and a signal controller 600 that controls the above elements.

The display panel 300 includes a plurality of signal lines $G_1$-$G_n$ and $D_1$-$D_m$, a plurality of voltage lines (not shown), and a plurality of pixels PX connected to the signal lines $G_1$-$G_n$ and $D_1$-$D_m$ and the voltage lines and arranged substantially in a matrix, as shown in the equivalent circuit diagram of FIG. 2.

The signal lines $G_1$-$G_n$ and $D_1$-$D_m$ include a plurality of scanning lines $G_1$-$G_n$ for transmitting scanning signals and a plurality of data lines $D_1$-$D_m$ for transmitting data signals. The scanning lines $G_1$-$G_n$ extend substantially in a row direction and are substantially parallel to each other, while the data lines $D_1$-$D_m$ extend substantially in a column direction and are substantially parallel to each other. The scanning lines $G_1$-$G_n$ and the data lines $D_1$-$D_m$ are substantially perpendicular to each other. Each of the voltage lines transmits a driving voltage Vdd.

Referring to FIG. 2, each pixel PX, for example a pixel PX in an i-th row (i=1, 2, . . . , n) and a j-th column (j=1, 2, . . . , m), is connected to a scanning line Gi and a data line Dj, and includes an OLED LD, a driving transistor Qd, a capacitor Cst, and a switching transistor Qs.

The driving transistor Qd, which may be a TFT, has three terminals, such as an input terminal connected to the driving voltage Vdd and one side of the capacitor Cst, an output terminal connected to an anode terminal of the OLED LD, and a control terminal connected to the output terminal of the switching transistor Qs and the other side of the capacitor Cst. The driving transistor Qd is supplied with a data voltage from the control terminal thereof through the switching transistor Qs. The driving transistor Qd then allows a driving current ILD corresponding to the data voltage to flow to the OLED LD.

The OLED LD has an anode connected to the output terminal of the driving transistor Qd and a cathode connected to a common voltage Vcom. The OLED LD emits light having an intensity depending on the output current ILD of the driving transistor Qd.

The capacitor Cst is connected between the control terminal and the input terminal of the driving transistor Qd. The capacitor Cst charges a voltage depending on a difference between the data voltage applied to the control terminal of the driving transistor Qd through the switching transistor Qs and the driving voltage Vdd.

The switching transistor Qs, which may be a TFT, has three terminals including; a control terminal connected to a scanning line $G_i$, an input terminal connected to the data line $D_j$, and an output terminal connected to the control terminal of the driving transistor Qd. The switching transistor Qs is turned on by a scanning signal through the scanning line $G_i$ and transmits a data voltage through the data line $D_i$ to the control terminal of the driving transistor Qd.

According to an exemplary embodiment, the switching transistor Qs and the driving transistor Qd are n-channel field effect transistors ("FETs") including amorphous silicon or polysilicon. However, at least one of the transistors Qs and Qd may be a p-channel FET operating in a manner opposite to the n-channel FETs.

A structure of an OLED LD and a driving transistor Qd connected to thereto as shown in FIG. 2 will be described in detail with reference to FIGS. 3 and 4.

Figure 3:
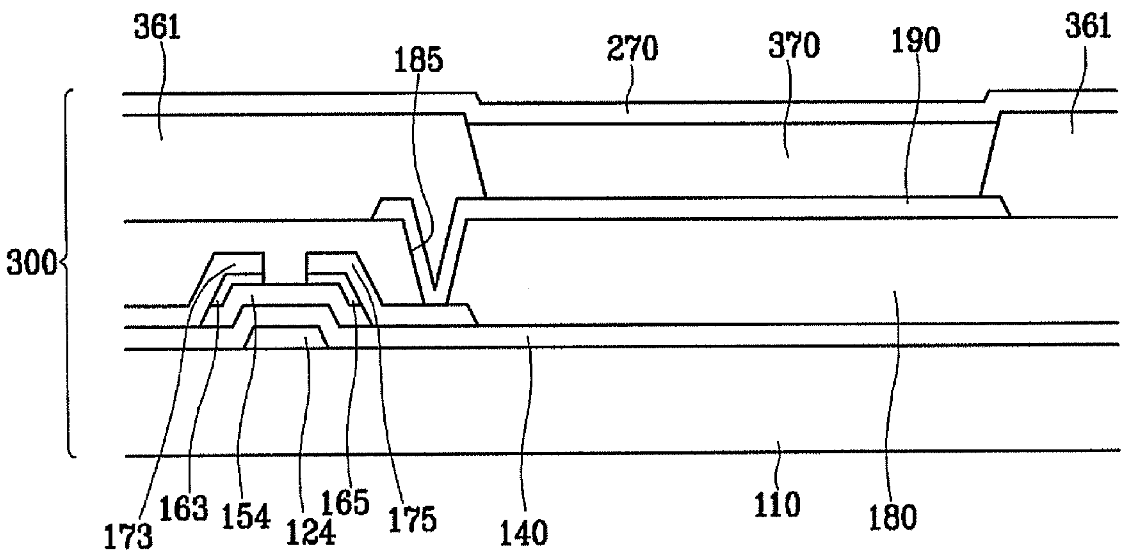
FIG. 3 is a cross-sectional diagram of an exemplary embodiment of a driving transistor and an OLED of a pixel of an OLED display according to the present invention.
Figure 4:
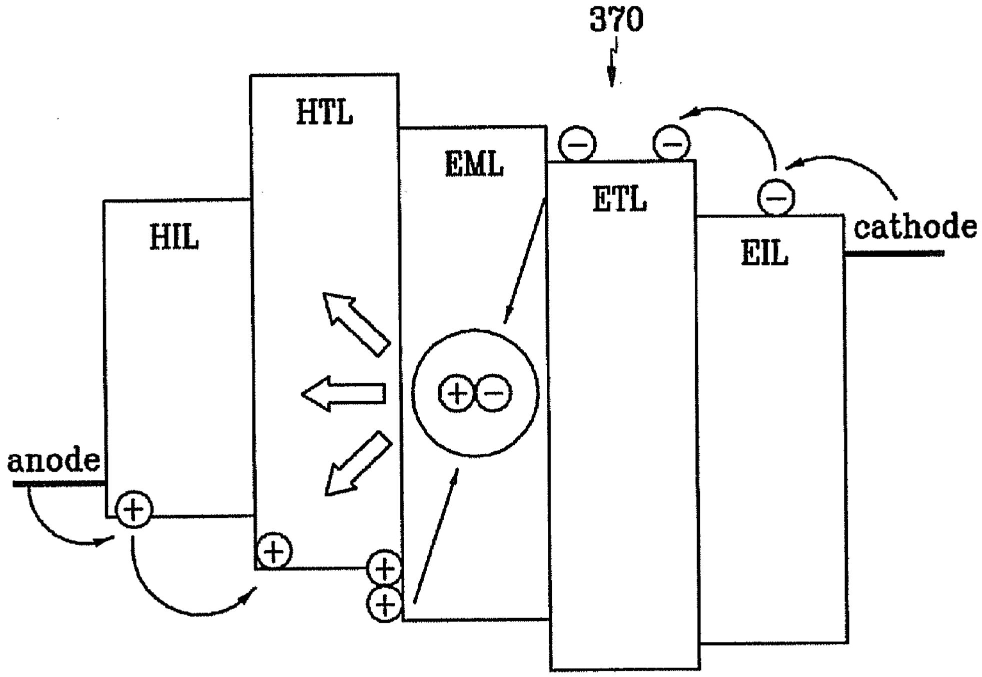
FIG. 4 is a schematic diagram of an exemplary embodiment of an OLED display according to the present invention.

FIG. 3 is a cross-sectional diagram of an exemplary embodiment of a driving transistor and an OLED of a pixel of an OLED display according to the present invention, and FIG. 4 is a schematic diagram of an OLED display according to the present invention.

A control electrode 124 is formed on an insulating substrate 110. The control electrode 124 is preferably made of Al or an Al alloy, Ag or an Ag alloy, Cu or a Cu alloy, Mo or a Mo alloy, Cr, Ti, Ta or any combination thereof. Exemplary embodiments of the control electrode 124 may have a multi-layered structure including two films having different physical characteristics. One of the two films may be made of a low resistivity metal, exemplary embodiments of which include Al, an Al alloy, Ag, an Ag Alloy, Cu, a Cu alloy, or any combination thereof for reducing signal delay or voltage drop. The other film may be made of a material, exemplary embodiments of which include Mo, a Mo alloy, Cr, Ta, Ti, or any combination thereof, which has good physical, chemical, and electrical contact characteristics with other materials such as indium tin oxide ("ITO") or indium zinc oxide ("IZO"). Exemplary embodiments of the combination of the two films are a lower Cr film and an upper Al alloy film and a lower Al alloy film and an upper Mo alloy film. However, the control electrode 124 may be made of other various metals or conductors.

The lateral sides of the control electrode 124 are inclined relative to a surface of the substrate, and the inclination angle thereof ranges from about 30 degrees to about 80 degrees.

An insulating layer 140, preferably made of silicon nitride ("SiNx"), is formed on the control electrode 124.

A semiconductor 154, preferably made of hydrogenated amorphous silicon (abbreviated to "a-Si") or polysilicon, is formed on the insulating layer 140. A pair of ohmic contacts 163 and 165, exemplary embodiments of which may be made of silicide or n+ hydrogenated a-Si heavily doped with an n-type impurity such as phosphorous, are formed on the semiconductor 154. The lateral sides of the semiconductor 154 and the ohmic contacts 163 and 165 are inclined relative to the surface of the substrate, and the inclination angles thereof range from about 30 degrees to about 80 degrees.

An input electrode 173 and an output electrode 175 are formed on the ohmic contacts 163 and 165 and the insulating layer 140. Exemplary embodiments of the input electrode 173 and the output electrode 175 may be made of a refractory metal such as Cr, Mo, Ti, Ta, or alloys thereof. Exemplary embodiments of the input electrode 173 and the output electrode 175 may have a multilayered structure including a refractory metal film (not shown) and a low resistivity film (not shown). One exemplary embodiment of the multi-layered structure is a double-layered structure including a lower Cr/Mo alloy film and an upper Al alloy film. Another exemplary embodiment of the multi-layered structure is a triple-layered structure including a lower Mo alloy film, an intermediate Al alloy film, and an upper Mo alloy film. Like the control electrode 124, the input electrode 173 and the output electrode 175 have inclined edge profiles, and the inclination angles thereof range from about 30 degrees to about 80 degrees.

The input electrode 173 and the output electrode 175 are separated from each other and disposed opposite each other with respect to a control electrode 124. The control electrode 124, the input electrode 173, and the output electrode 175 as well as the semiconductor 154 form a TFT serving as a driving transistor Qd having a channel located between the input electrode 173 and the output electrode 175.

The ohmic contacts 163 and 165 are interposed between the underlying semiconductor stripes 151 and the overlying electrodes 173 and 175 thereon, and reduce the contact resistance therebetween. The semiconductor 154 includes an exposed portion, which is not covered by the ohmic contacts 163 and 165 or the input electrode 173 and the output electrode 175.

A passivation layer 180 is formed on the electrode 173 and 175, the exposed portion of the semiconductor 154, and the insulating layer 140. Exemplary embodiments of the passivation layer 180 are preferably made of an inorganic or organic insulator and they may have a flat top surface. Exemplary embodiments of the inorganic insulator may include silicon nitride and silicon oxide. In the exemplary embodiment where the passivation layer is an organic insulator, it may have photosensitivity and a dielectric constant of less than about 4.0. Alternative exemplary embodiments include configurations where the passivation layer 180 may include a lower film of an inorganic insulator and an upper film of an organic insulator such that it possesses the excellent insulating characteristics of the organic insulator while preventing the exposed portions of the semiconductor 154 from being damaged by the organic insulator.

A pixel electrode 190 is formed on the passivation layer 180. The pixel electrode 190 is physically and electrically connected to the output terminal electrode 175 through a contact hole 185. Exemplary embodiments of the pixel electrode 190 may be made of a transparent conductor such as ITO or IZO or a reflective metal such as Ag, Al, or alloys thereof.

A partition 361 is formed on the passivation layer 180. The partition 361 encloses the pixel electrode 190 to define an opening on the pixel electrode 190. Exemplary embodiments of the partition 361 are preferably made of an organic or inorganic insulating material.

An organic light emitting member 370 is formed on the pixel electrode 190 and is confined in the opening enclosed by the partition 361.

Referring to FIG. 4, exemplary embodiments of the organic light emitting member 370 have a multilayered structure including an emitting layer EML and auxiliary layers for improving the efficiency of light emission of the emitting layer EML. The auxiliary layers may include an electron transport layer ETL and a hole transport layer HTL for improving the balance of the electrons and holes, and an electron injecting layer EIL and a hole injecting layer HIL for improving the injection of the electrons and holes. Alternative exemplary embodiments include the configuration where the auxiliary layers may be omitted.

Referring again to FIG. 3, a common electrode 270 supplied with a common voltage Vcom is formed on the organic light emitting member 370 and the partition 361. Exemplary embodiments of the common electrode 270 are preferably made of a reflective metal such as Ca, Ba, Cr, or Al, or a transparent conductive material such as ITO or IZO.

A combination of opaque pixel electrodes 190 and a transparent common electrode 270 is employed in a top-emission type OLED display which emits light toward the top of the display panel 300, and a combination of transparent pixel electrodes 190 and an opaque common electrode 270 is employed in a bottom-emission type OLED display which emits light toward the bottom of the display panel 300.

As shown in FIGS. 2 and 3, a pixel electrode 190, an organic light emitting member 370, and a common electrode 270 form an OLED LD having the pixel electrode 190 as an anode and the common electrode 270 as a cathode or vice versa.

According to the present exemplary embodiment the OLED LD of each pixel emits light of one primary color depending on the material of the light emitting member 380. One example of a set of primary colors includes red, green, and blue. The addition of the three primary colors from various pixels enables the display to generate a multitude of colors, including white light.

Alternative exemplary embodiments include configurations where the OLED LD is configured to have a light emitting member 380 which comprises materials allowing a single pixel to generate a set of primary colors. A set of color filters may then be applied to a plurality of pixels so that each pixel generates one of a set of primary colors.

Referring to FIG. 1 again, the scanning driver 400 is connected to the scanning lines $G_1$-$G_n$ of the display panel 300 to apply scanning signals $Vg_1$-$Vg_n$ to the scanning lines $G_1$-$G_n$. The scanning driver 400 will be described in detail with reference to FIG. 5 below.

Figure 5:
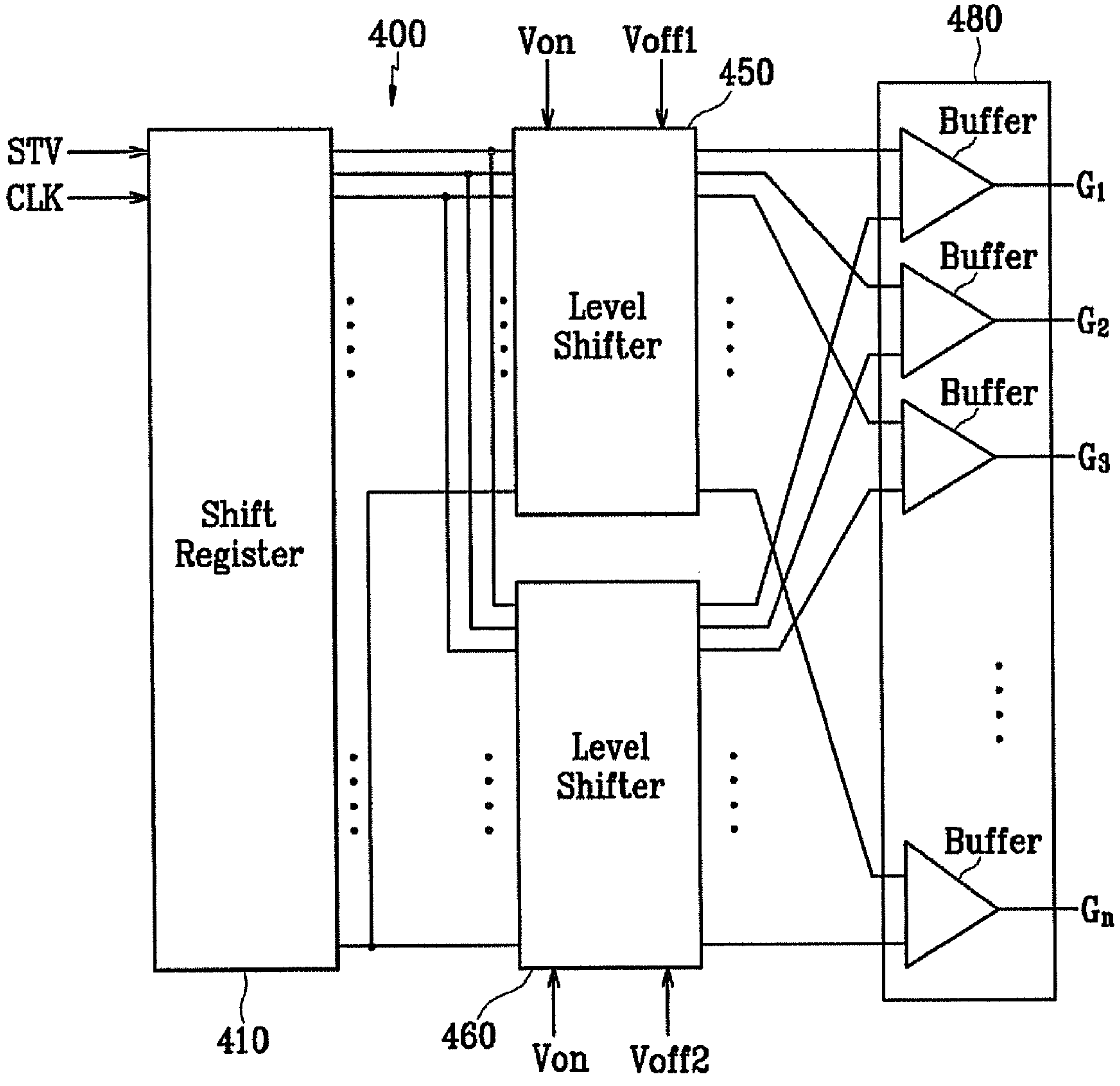
FIG. 5 is a block diagram of an exemplary embodiment of a scanning driver of an OLED display according to the present invention.

FIG. 5 is a block diagram of an exemplary embodiment of a scanning driver of an OLED display according to the present invention.

Referring to FIG. 5, an exemplary embodiment of a scanning driver 400 according to the present invention includes a shift register 410, a first level shifter 450 and a second level shifter 460 connected to the shift register 410, and an output unit 480 connected to the first and second level shifters 450 and 460.

The shift register 410 is supplied with control signal CONT1, which includes signals STV and CLK, and Von and Voff1, from the signal controller 600. The shift register 410 includes a plurality of flip-flop stages. By application of the control signal STV to a first stage of the flip-flops, the shift register 410 sequentially outputs output signals having a pulse width based on the control signal CLK. At this time, an output signal from the previous flip-flop stage is applied to an input terminal of the next flip-flop stage such that the output signals are sequentially outputted from the first flip-flop stage to the last flip-flop stage based on the clock signals.

The first level shifter 450 is supplied with a turn-on voltage Von and a first turn-off voltage Voff1 for turning on and turning off the switching transistors Qs of the pixels PX, respectively. The first level shifter 450 is also supplied with the output signals from the shift register 410.

The second level shifter 460 is supplied with a turn-on voltage Von and a second turn-off voltage Voff2 for turning on and turning off the switching transistors Qs of the pixels PX, respectively. The second level shifter 460 is also supplied with the output signals from the shift register 410. At this time, the second turn-off voltage Voff2 has a level that is lower than that of the first turn-off voltage Voff1.

The output unit 480 includes a plurality of buffers that are connected to the scanning lines $G_1$-$G_n$, respectively. The output unit 480 is supplied with a control signal (not shown) from the signal controller 600, and selects one of the first and second level shifters 450 and 460 to output the output signals from the selected level shifter 450 or 460 to the scanning lines $G_1$-$G_n$ as scanning signals.

Referring to FIG. 1 again, the data driver 500 is connected to and applies data voltages to the data lines $D_1$-$D_m$ of the display panel 300. The data voltages may be normal data voltages, such as those used for displaying images, or they may be compensating data voltages, such as those used for reversing the bias of threshold voltages of the driving transistors Qd. The compensating data voltages Cdat may function as reverse bias voltages of the driving transistors Qd. The data associated with the data voltages Cdat is called compensating image data.

The scanning driver 400 and data driver 500 may be implemented as an integrated circuit ("IC") chip mounted on the display panel 300, or on a flexible printed circuit ("FPC") film in a tape carrier package ("TCP") attached to the display panel 300. Alternative exemplary embodiments include configurations wherein they may be integrated into the display panel 300 along with the signal lines $G_1$-$G_n$ and $D_1$-$D_m$ and the transistors Qd and Qs to employ a system on panel ("SOP") configuration.

The signal controller 600 controls the scan driver 400 and the data driver 500.

The operation of the above-described OLED display will now be described in detail.

The signal controller 600 is supplied with input image signals R, G, and B and input control signals for controlling the display thereof from an external graphics controller (not shown). The input image signals R, G, and B contain luminance information for each pixel PX, and the luminance has a predetermined number of grays, for example 1024 ($=2^{10}$), 256 ($=2^8$) or 64 ($=2^6$) grays. The input control signals include a vertical synchronization signal Vsync, a horizontal synchronization signal Hsync, a main clock signal MCLK, a data enable signal DE.

After generating gate control signals CONT1 and data control signals CONT2 and processing the image signals R, G, and B to be suitable for the operation of the panel assembly 300 on the basis of the input control signals and the input image signals R, G, and B, the signal controller 600 transmits the gate control signals CONT1 to the scanning driver 400, and the processed image signals DAT and the data control signals CONT2 to the data driver 500.

The image data DAT include normal image data based on the input image signals R, G, and B and compensating image data. In the current exemplary embodiment of the present invention, the compensating image data has a constant predetermined value calculated to prevent the shifting of the threshold voltages of the driving transistors Qd, and is supplied for turning off the driving transistor Qd. However, the compensating image data may be substantially the same as the normal image data or have values that vary in proportion to the normal image data.

Exemplary embodiments of the scanning control signal CONT1 include a scanning start signal STV for instructing to start scanning a high voltage and at least one clock signal CLK for controlling the output time of the high voltage. Exemplary embodiments of the scanning control signals CONT1 may further include an output enable signal OE for defining the duration of the high voltage.

Exemplary embodiments of the data control signals CONT2 include a horizontal synchronization start signal STH for informing of start of data transmission to a group of pixels PX, a load signal LOAD for instructing to apply the data voltages to the data lines $D_1$-$D_m$, a selection signal for selecting one of the normal image data and the compensating image data, and a data clock signal HCLK. The selection signal has one of a high level and a low level.

Figure 6:
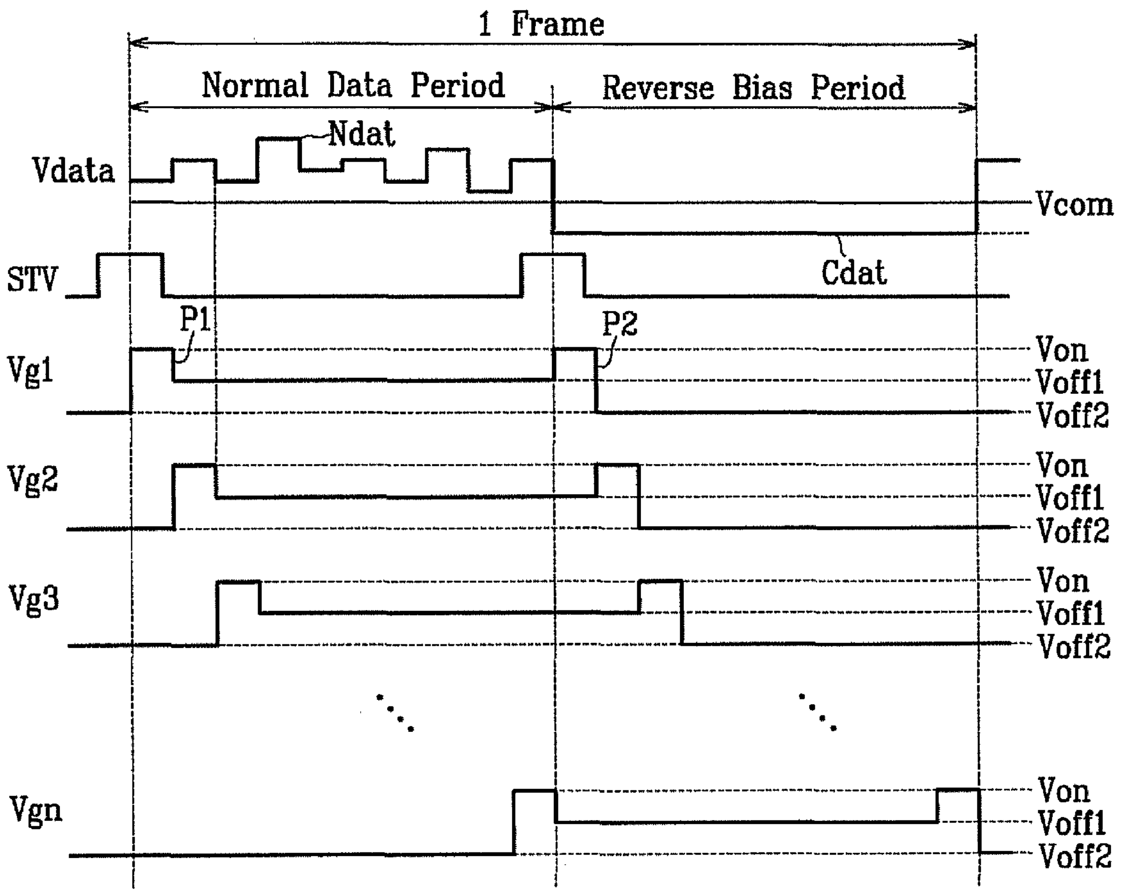
FIG. 6 is a signal waveform diagram showing operations of an exemplary embodiment of an OLED display according to the present invention.
Figure 7:
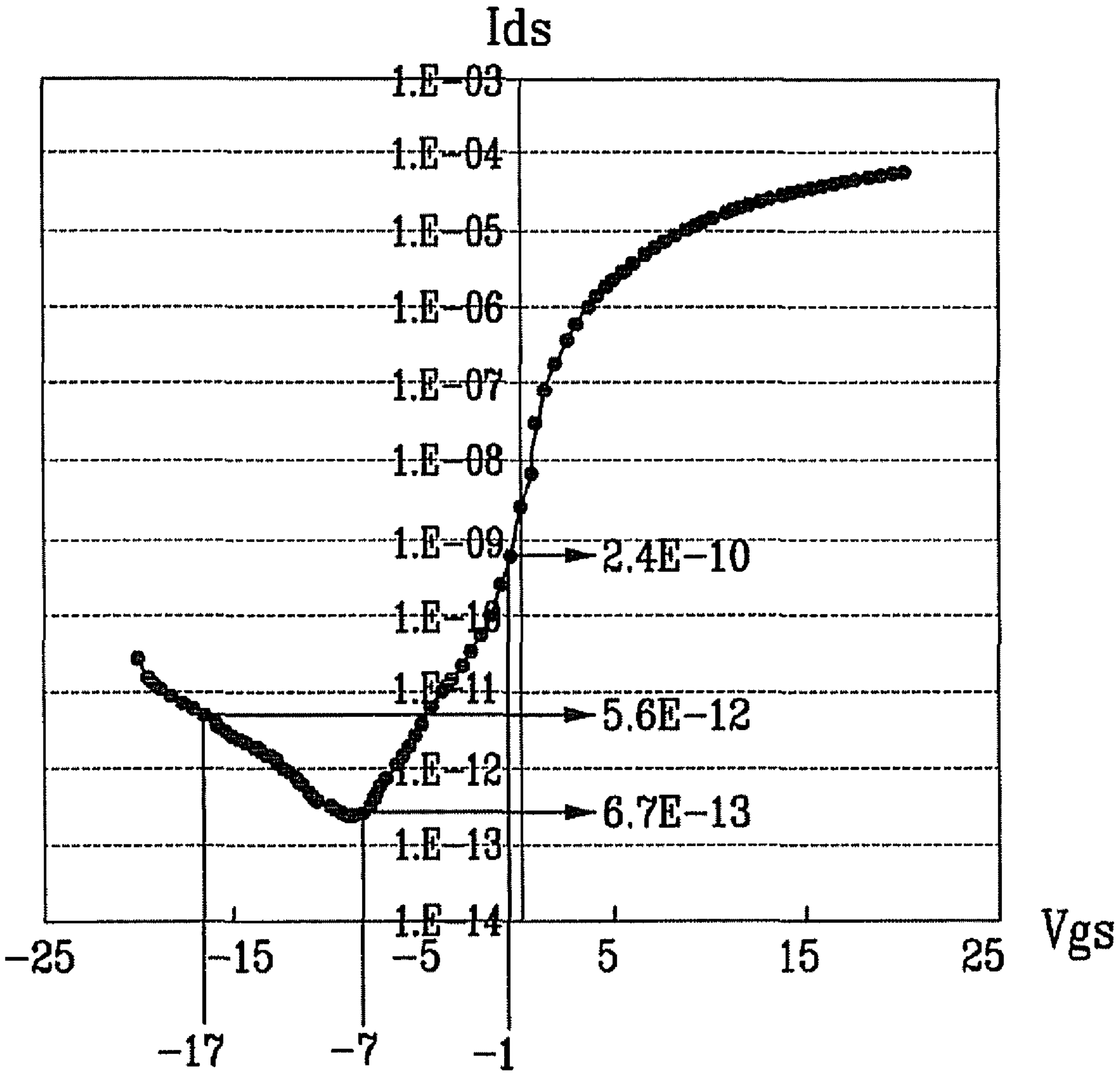
FIG. 7 is a voltage-current characteristic curve of an exemplary embodiment of a switching transistor of an OLED display according to the present invention.
Figure 8:
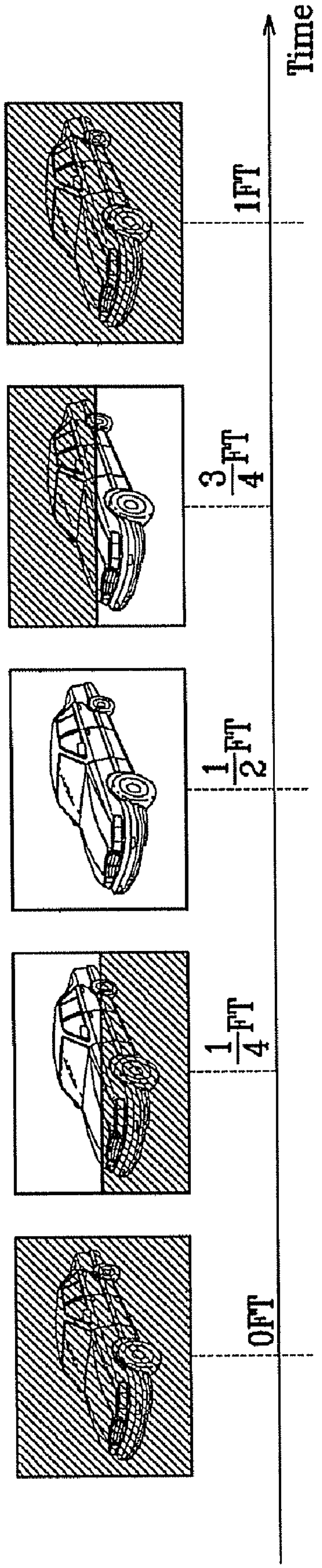
FIG. 8 is a schematic view showing a screen of an exemplary embodiment of an OLED display on which an image is displayed according to the driving signals shown in FIG. 6.

Referring to FIGS. 6 through 8, the operation of an exemplary embodiment of an OLED display according to the present invention will be described.

FIG. 6 is a signal waveform diagram showing operations of an exemplary embodiment of an OLED display according to the present invention, FIG. 7 is a voltage-current characteristic curve of an exemplary embodiment of a switching transistor of an OLED display according to the present invention, and FIG. 8 is a schematic view showing a screen of an exemplary embodiment of an OLED display on which an image is displayed according to the driving signals shown in FIG. 6.

The signal controller 600 divides one frame 1FT into a normal data period and a reverse bias period. The normal data voltages Ndat are applied in the normal data period and the compensating data voltages Cdat are applied in the reverse bias period. As described above, an exemplary embodiment of the selection signal has one of a high level and a low level, and for example, has a high level in the normal data period and a low level in the reverse bias period. However, the level of the selection signal may be varied.

Thereby, since in the normal data period the selection signal has a high level, the data driver 500 selects the normal image data from the image data DAT, which includes both the normal image data and the compensating image data, and converts the digital normal image data DAT into analog normal data voltages Ndat to apply to the data lines $D_1$-$D_m$ as data voltages Vdata.

Next, the scanning driver 400 operates in response to the scanning control signals CONT1 from the signal controller 600.

That is, after being supplied with the scanning start signal STV from the signal controller 600, the shift register 410 of the scanning driver 400 sequentially outputs output signals, each of which has a pulse width defined by the clock signal CLK, from the first flip-flop stage to the last flip-flop stage to apply them to the first and second level shifters 450 and 460.

The first level shifter 450 of the scanning driver 400 increases levels of the output signals from the shift register 410 to a turn-on voltage level Von, maintains the increased output signals for a predetermined time, and decreases the levels of the output signals to the first turn-off voltage level Voff1 to sequentially output a first pulse signal P1 to the output unit 480.

The second level shifter 460 operates in substantially the same manner as the first level shifter 450. The second level shifter 460 of the scanning driver 400 increases levels of the output signals from the shift register 410 to a turn-on voltage level Von, maintains the increased output signals for a predetermined time, and decrease the levels of the output signals to the second turn-off voltage level Voff2 to sequentially output a second pulse signal P2 to the output unit 480.

Next, the output unit 480 selects one of the first and second level shifters 450 and 460 based on the state of a control signal (not shown), and sequentially outputs the pulse signal P1 or P2 from the selected level shifter 450 or 460 to the scanning lines $G_1$-$G_n$ as scanning signals $Vg_1$-$Vg_n$. That is, in response to an indication from the control signal that the display is in the normal data period, the output unit 480 selects the first level shifter 450, while in response to an indication from the control signal that the display is in the reverse bias period, the output unit 480 selects the second level shifter 450.

Therefore, in the normal data period, the output unit 480 selects the first level shifter 450, and sequentially outputs the first pulse signal P1 to be output as the scanning signals $Vg_1$-$Vg_n$.

The scanning signal $Vg_i$ (i=1, 2, . . . , n) having a turn-on voltage level Von, turns-on the switching transistors Qs of the i-th pixel row so that the normal data voltages Ndat are applied to the control terminals of the driving transistors Qd. Thereby, the driving transistors Qd output driving currents ILD defined depending on the normal data voltages Ndat to the anodes of the OLEDs LD. The OLEDs LD emit light having an intensity depending on the driving current ILD of the driving transistor Qd. Meanwhile, the normal data voltages Ndat are applied to the capacitors Cst, and thereby the OLEDs LD maintain the emitting light for a predetermined time after transiting from the turn-on voltage time region into the first turn-off voltage time region of the scanning signal $Vg_i$.

As above-described, in the normal data period, the operation for emitting light is sequentially performed from a first pixel row to a last pixel row such that images corresponding to the input image signals R, G, and B are displayed on the display panel 300.

After application of the scanning signal $Vg_n$ having the turn-on voltage level Von to the last pixel row, the normal data voltages Ndat with respect to the pixels PX of the last pixel row are applied to charge the pixels PX, and then the reverse bias period starts.

In the reverse bias period, the selection signal has a low level. Thereby, the data driver 500 selects the compensating image data from the image data DAT, which includes the normal image data and the compensating image data, and converts the digital normal image data DAT into analog compensating data voltages Cdat to apply to the data lines $D_1$-$D_m$ as data voltages Vdata.

In this state, the scanning driver 400, as described above, starts the operation thereof by application of the scanning stat signal STV and the clock signal CLK. Thereby, the first and second level shifters 450 and 460 of the scanning driver 400 sequentially output the first and second pulse signals P1 and P2 to the output unit 480, respectively. At this time, the output unit 480 selects the second pulse signal P2 in response to the control signal (not shown) and outputs the second pulse signal P2 from the second level shifter 460 to the scanning lines $G_1$-$G_n$ as scanning signals $Vg_1$-$Vg_n$.

The scanning signal $Vg_i$, having a turn-on voltage level Von, turns-on the switching transistors Qs of the i-th pixel row so that the compensating data voltages Cdat are applied to the control terminals of the driving transistors Qd. Thereby, the driving transistors Qd are turned off to stop the output of the driving currents ILD such that the OLEDs LD stop emitting light. As above-described, in the reverse bias period, the output of the driving currents ILD is sequentially stopped from the first pixel row to the last pixel row such that black color, or blank, images are sequentially displayed on the display panel 300.

Next, a graph comparing currents to voltages of a switching transistor of an exemplary embodiment of an OLED display according to the present invention will be described with reference to FIG. 7.

FIG. 7 is a voltage-current characteristic curve of an exemplary embodiment of a switching transistor of an OLED display according to the present invention.

FIG. 7 shows a current Ids of the output terminal graphed with respect to a voltage between a control terminal and an input terminal. It is assumed that a normal data voltage Ndat is about 0 V to 10 V, a compensating data voltage is about −6 V, and a first turn-off voltage level Voff1 of a scanning signal $Vg_i$ is about −7 V.

When the scanning signal $Vg_i$ transitions from the turn-on voltage level Von into the first turn-off voltage level Voff1 in the normal data period, a switching transistor Qs connected to the scanning line $G_i$ turns off. At this time, a voltage Vgs between a control terminal and an input terminal of the switching transistor Qs is about −7 V to about −17 V, and a leakage current Ids of about 6.7 E-13 mA to about 5.6 E-12 mA flows from an output terminal of the switching transistor Qs to the input terminal of the driving transistor Qd depending upon the characteristics of the switching transistor Qs However, a voltage variation in the driving transistor Qd caused by the leakage current Ids of this magnitude does not influence the output of the OLED LD enough to affect the grayscale of the images to be displayed, so it may be ignored.

However, if in the revise bias period, the second turn-off voltage level Voff2 of the scanning signal $Vg_i$ maintains a voltage of about −7 V, which is equal to the first turn-off voltage level Voff1 in the normal data period, and the scanning signal $Vg_i$ is transited from the turn-on level Von into the second turn-off voltage level Voff2, the voltage Vgs of the switching transistor Qs becomes about −1V.

A Vgs voltage of this magnitude may cause a leakage current Ids of about 2.4 E-10 mA. This shows that an amount of the leakage current Ids in the reverse bias period is significantly increased to be about 50 to 350 times the amount of leakage in the normal data period. This increased current leakage increases a voltage variation with respect to a control terminal of a driving transistor Qd control terminal and may adversely affect the grayscale of the OLED LD.

According to an exemplary embodiment of the present invention the second turn-off voltage level Voff2 of the scanning signal $Vg_i$ in the reverse bias period goes down to about −13 V and the voltage Vgs of the turned-off switching transistor Qs is thereby made to maintain about −7 V to decrease the amount of the leakage current Ids.

Even though the level of the scanning signal $Vg_i$ goes down from the turn-on voltage level Von to the second turn-off level Voff2 in the reverse bias period, the control terminal of the driving transistor Qd maintains the compensating data voltage Cdat which is used to decrease a variation of a threshold voltage of the driving transistor Qd. As a result, the compensating data voltage Cdat is supplied to the control terminal of the driving transistor Qd for a predetermined time to turn off the driving transistor Qd such that stress on the driving transistor Qd due to output of the driving current $I_{LD}$ is reduced. In essence, the compensating data voltage Cdat provides a rest period for the driving transistor Qd. This rest period reduces or effectively prevents a shifting of the driving transistor Qd's threshold voltage over time.

A variation of a screen for displaying images by the operation of the OLED display will be described with reference to FIG. 8 FIG. 8 is a schematic view showing a screen of the exemplary embodiment of an OLED display on which an image is displayed according to the driving signals shown in FIG. 6.

Referring to FIG. 8, a black color (or blank) image is displayed on the entire screen at the initial time of one frame according to the compensating data voltages Cdat of the previous frame. When a normal data period starts, an image is sequentially displayed from the top portion of the screen down. At one quarter of a frame time length ¼FT, the image is displayed on an upper half of the screen. When the normal data period ends at one half of a frame time length ½FT, the image is displayed on the entire screen.

Next, when a reverse bias period starts, a black (or blank) color image is sequentially displayed from the top portion of the screen down. At three quarters of a frame time length ¾FT, the black image is displayed on the upper half of the screen. When the reverse bias period ends at the end of one whole frame time length the black image is displayed on the entire screen. The process may then repeat to display sequential images.

A pixel PX emits light corresponding to normal data voltages Ndat until compensating data voltages Cdat are applied. After the data voltages Cdat are applied the pixel PX does not emit light again until normal data voltages Ndat of the next frame are applied. As a result, the pixel PX does not emit light for ½ of one frame time length 1FT, and therefore an unclear image or a blurring phenomenon may be reduced or effectively prevented.

In an exemplary embodiment where a frame frequency of input image signals R, G, and B is about 60 Hz, the signal controller 600 supplies digital image data DAT to the data driver 500 at a frame frequency of about 120 Hz. The input image signals R, G, and B provide a new image every $60^{th}$ of a second. The data driver has to display that original image information and additional compensating image information. Essentially, the signal controller 600 is putting twice the amount of information into the same frame length time period so it needs to double the frequency at which it provides information to the data driver 500.

In another exemplary embodiment one reverse bias period may be assigned for every normal data periods of n numbers (where n is an integer). That is, when the number of normal data periods is ten, an image is displayed for the ten normal data periods, and then a black color image is displayed for one reverse bias period. In this exemplary embodiment if the signal controller 600 is supplied with input image signals R, G, and B of about 60 Hz, it would output image signals to the data driver 500 at about 66 Hz.

Figure 9:
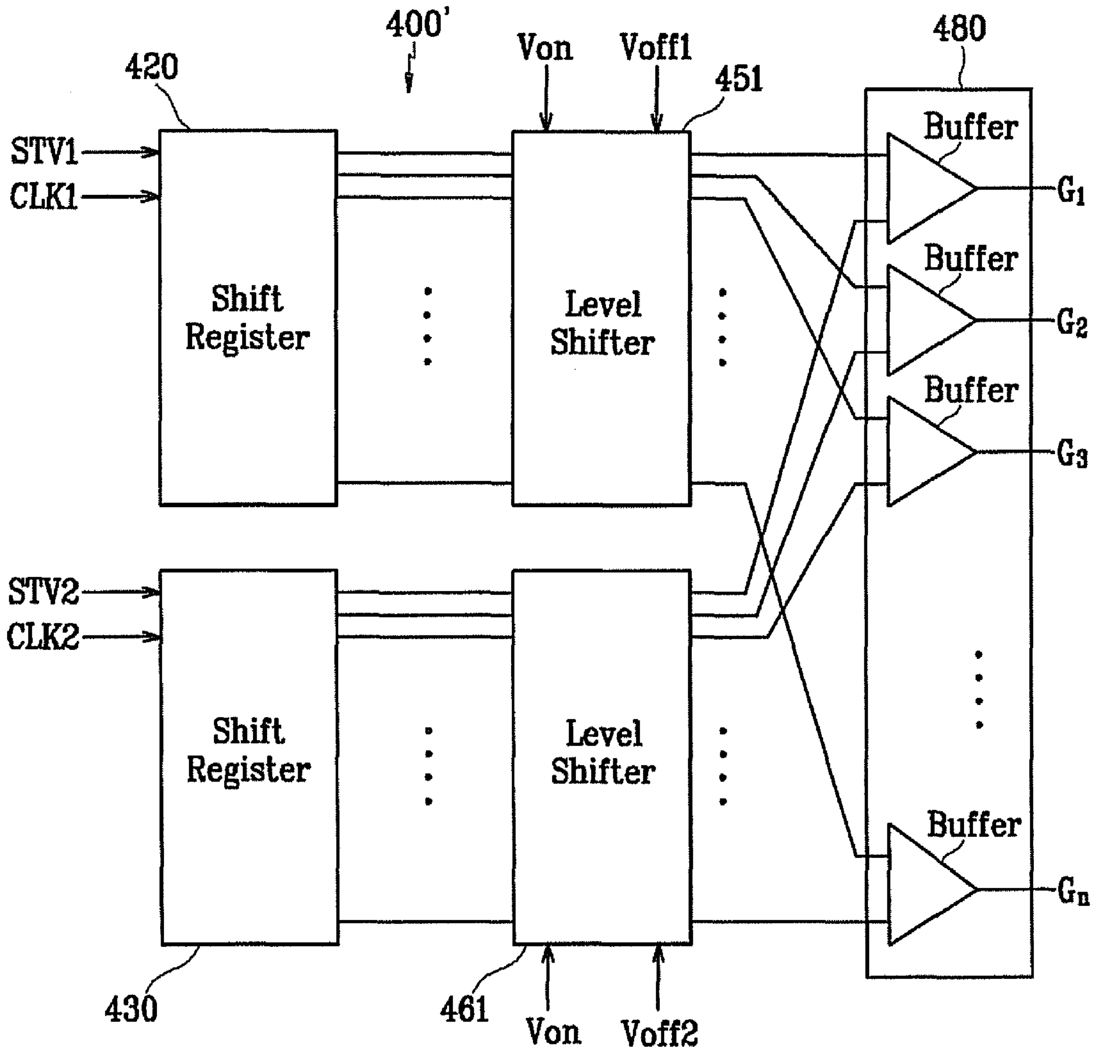
FIG. 9 is a block diagram of another exemplary embodiment of a scanning driver of an OLED display according to the present invention.

FIG. 9 is a block diagram of another exemplary embodiment of a scanning driver of an OLED display according to the present invention.

Referring to FIG. 9, an exemplary embodiment of a scanning driver 400' according to the present invention is similar to the scanning driver 400 shown in FIG. 5.

That is, the scanning driver 400' includes shift registers 420 and 430, level shifters 451 and 461 connected to the shift registers 420 and 430, respectively, and an output unit 480 connected to the level shifters 451 and 461.

The scanning driver 400' shown in FIG. 9 includes two first and second shift registers 420 and 430 each of which is supplied with a scanning start signal STV1 and STV2 and a clock signal CLK1 and CLK2, respectively. The scanning driver 400' also includes two first and second level shifters 451 and 461 connected to the first and second shift registers 420 and 430, respectively. Each of the first and second shift registers 420 and 430 includes a plurality of flip-flops, similar to the shift register 410 shown in FIG. 5.

Thereby, by application of the scanning start signal STV1 or STV2, the first or second shift register 420 or 430 generates a first or second pulse signal P1 or P2 having a pulse width of a predetermined magnitude based on the clock signal CLK1 or CLK2 to sequentially output it to the first or second level shifter 451 or 461.

Therefore, the first and second shift registers 420 and 430 operate whenever the corresponding scanning start signals STV1 and STV2 are applied. According to the present exemplary embodiment the first shift register 420 is for application of normal data voltages Ndat and the second shift register 430 is for application of compensating data voltages Cdat.

The first level shifter 451 is supplied with a turn-on voltage Von and a first turn-off voltage Voff1 and generates first pulse signals P1 based on the output signals from the first shift register 420 to sequentially output them to the output unit 480, and the second level shifter 461 is supplied with the turn-on voltage Von and a second turn-off voltage Voff2 and generates second pulse signals P1 based on the output signals from the second shift register 430 to sequentially output them to the output unit 480. According to the present exemplary embodiment the first turn-off voltage level Voff1 is larger than the second turn-off voltage level Voff2, but the magnitude relationship may be varied.

The output unit 480 includes a plurality of buffers, and sequentially applies the pulse signals P1 or P2 from the first or second level shifter 451 or 461 to the scanning lines $G_1$-$G_n$. Thereby, the first pulse signal P1 is sequentially applied to the scanning lines $G_1$-$G_n$ for applying the normal data voltages Ndat, and the second pulse signal P2 is sequentially applied to the scanning lines $G_1$-$G_n$ for applying the compensating data voltages Cdat.

According to the another exemplary embodiment, the OLED display having the scanning driver 400' selectively operates one of the first or second shift register 420 or 430 such that power consumption is reduced. In addition, the scanning driver 400 may generate scanning signals that have different pulse widths defined by clock signals CLK1 and CLK2 having different periods through the first and second shift registers 420 and 430 and the level shifters 451 and 461.

Next, referring to FIG. 10, an operation of an OLED display having the exemplary embodiment of a scanning driver shown in FIG. 9 will be described.

Figure 10:
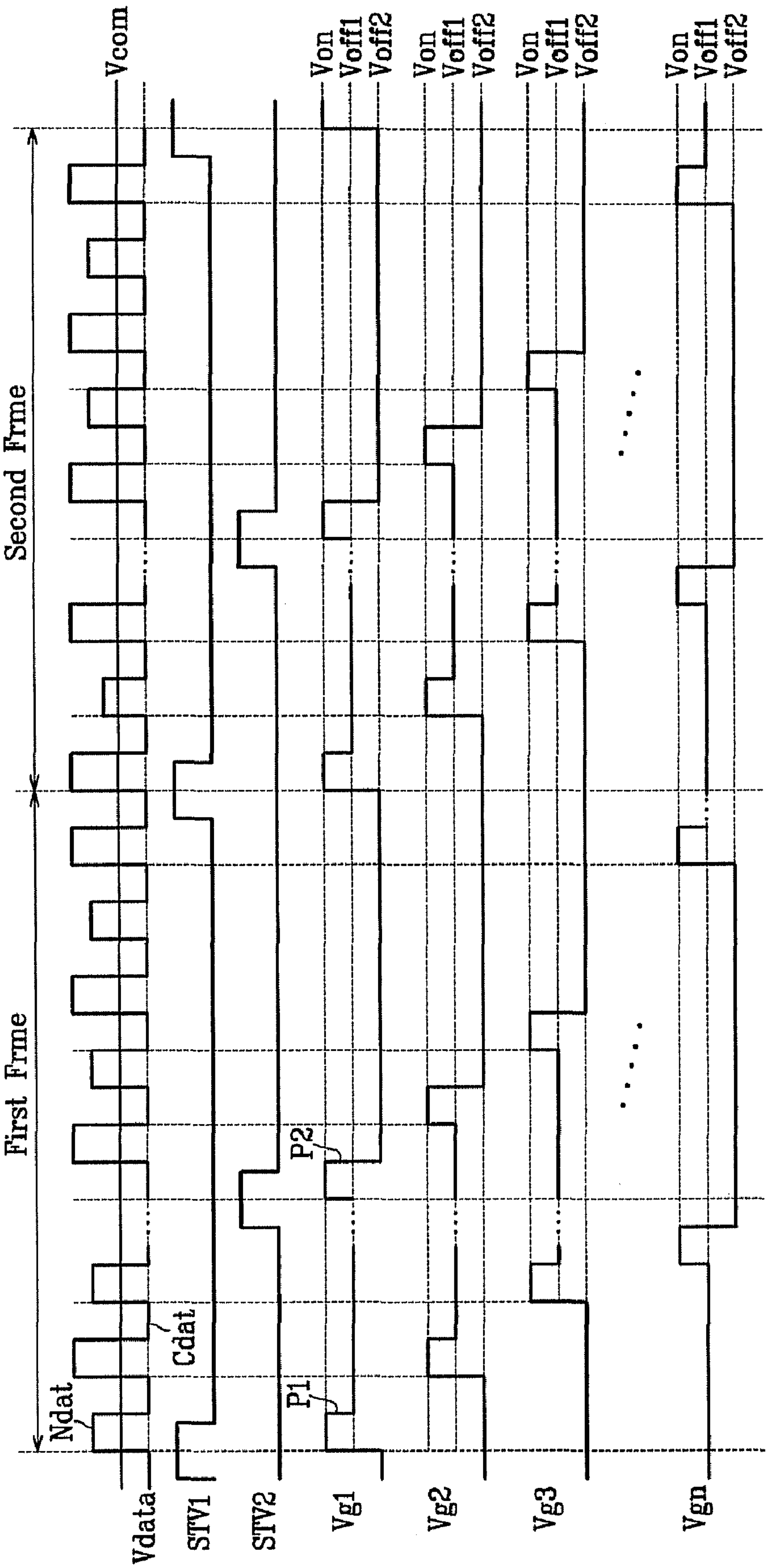
FIG. 10 is a signal waveform diagram showing operations of another exemplary embodiment of an OLED display according to the present invention.

FIG. 10 is a signal waveform diagram showing operations of another exemplary embodiment of an OLED display according to the present invention.

The OLED display, the waveform diagram of which is shown in FIG. 10, is substantially the same as the OLED display shown in FIG. 1, except for the scanning driver 400'. Therefore detailed descriptions thereof are omitted.

Referring to FIG. 10, the data driver 500 is supplied with digital image data DAT having normal image data and compensating image data.

The data driver 500 selects the normal image data for ½ a horizontal period (also referred to as "½H" and is equal to ½ a period of the horizontal synchronization signal Hsync and the data enable signal DE) and the compensating image data for the remaining ½H, converts it to the corresponding analog data voltages, and outputs a normal data voltage Ndat and a compensating data voltages Cdat about every ½H as data voltages Vdata to the data lines $D_1$-$D_m$.

Thereby, the data driver 500 alternately applies the normal data voltages Ndat and the compensating data voltages Cdat for about ½H, respectively.

The scanning driver 400' operates responsive to application of the first and second scanning start signals STV1 and STV2. That is, the first and second shift registers 420 and 430 and the first and second level shifters 451 and 461 operated by the scanning start signals STV1 and STV2, respectively, output the first and second pulse signals P1 and P2 to the corresponding scanning lines $G_1$-$G_n$ through the output unit 480 as scanning signals $Vg_1$-$Vg_n$.

At this time, the first and second scanning start signals STV1 and STV2 are applied to the first and second shift registers 420 and 430 having a pre-determined time difference between them. Thereby, the application times of the first and second pulse signals P1 and P2 to the same scanning line $G_i$ are different from each other by the predetermined time difference. In the present exemplary embodiment the first signal P1 is outputted at a time corresponding to an application time of the normal data voltages Ndat, and the second signal P2 is outputted at a time corresponding to an application time of the compensating data voltages Cdat.

According to one exemplary embodiment, the time difference between the first and second scanning start signals STV1 and STV2 is about 5H (five periods of the horizontal synchronization signal Hsync and the data enable signal DE), and in the same 1H the first pulse signal P1 is applied to a first scanning line $G_1$ for the first ½H and the second pulse signal P2 is applied to a sixth scanning line $G_6$ for the second ½H.

Thereby, the switching transistors Qs and the driving transistors Qd are operated by the scanning signals $Vg_1$ through Vgn having the turn-on voltage level Von sequentially applied from the first scanning line $G_1$ to the last scanning line $G_n$ such that an image corresponding to the normal data voltages Ndat is displayed.

Meanwhile, as described above, the second pulse signal P2 is sequentially applied as scanning signals $Vg_1$ through $Vg_n$ to the first scanning line $G_1$ through the last scanning line $G_n$ after a predetermined interval corresponding to the time difference between the first and second scanning start signals STV1 and STV2. The switching transistors Qs and the driving transistors Qd are operated by the scanning signals $Vg_1$ through $Vg_n$ of the turn-on voltage level Von sequentially applied from the first scanning line $G_1$ through the last scanning line $G_n$ so that a black color image corresponding to the compensating data voltages Cdat is displayed.

Accordingly, as described with reference to FIG. 6, by application of the compensating data voltages Cdat to a control terminal of the driving transistor Qd, a variation of a threshold voltage of the driving transistor Qd is reduced.

Furthermore, as described above, since the first and second turn-off voltage levels Voff1 and Voff2 are different, a leakage current flowing through the switching transistor Qs decreases.

A variation of a screen for displaying images by the operation of the OLED display will be described with reference to FIG. 11.

Figure 11:
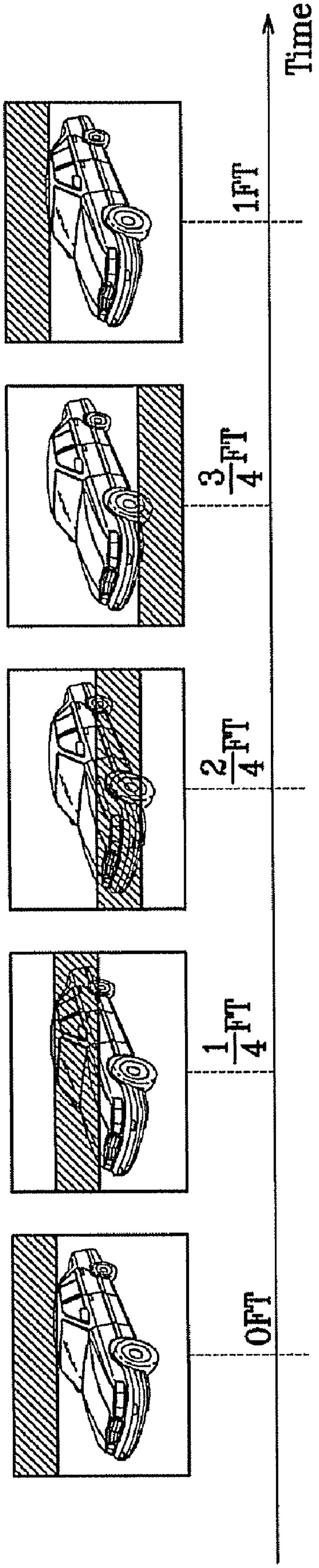
FIG. 11 is a schematic view showing a screen of the exemplary embodiment of an OLED display on which an image is displayed according to the driving signals shown in FIG. 10.

FIG. 11 is a schematic view showing a screen of the exemplary embodiment of an OLED display on which an image is displayed according to the driving signals shown in FIG. 10.

Referring to FIG. 11, an emitting time and a non-emitting time are determined by the time difference between the first and second scanning start signals STV1 and STV2 in the same frame as described, and a time difference between the second and first scanning start signals STV2 and STV1 in two adjacent frames. The time difference between the first and second scanning start signals STV1 and STV2 may be less than one frame. In the exemplary embodiment shown in FIG. 11, the time difference between the first and second scanning start signals STV1 and STV2 is ¾ of one frame 1FT.

The compensating data voltages Cdat are sequentially applied by the scanning signals $Vg_1$-$Vg_n$ of the second pulse signal P2 based on the second scanning start signal STV2 of the previous frame such that a black color image is displayed on ¼ of a screen at the initial time of one frame. When a first scanning start signal STV1 is applied to the gate driver 400', normal data voltages Ndat are sequentially applied by the scanning signals $Vg_1$-$Vg_n$ of the first pulse signal P1 such that an image corresponding to normal data voltages Ndat is sequentially displayed from the top portion of the screen down. At one quarter of a frame time length ¼FT, a normal data image is displayed on an upper ¼ portion of the screen, and the black image is displayed on the portion of the screen ¼ to ½ of the way down by application of the scanning signals $Vg_1$-$Vg_n$ based on the second scanning start signal STV2. That is, a black stripe having a width corresponding to ¼ of the screen is rotated from the upper portion to the lower portion of the screen every one frame period. Thereby, when one frame is finished the black stripe is again positioned on the upper ¼ portion of the screen.

A pixel PX emits light after the application of normal data voltages Ndat until compensating data voltages Cdat are applied, and does not emit light again until normal data voltages Ndat of the next frame are applied. As a result, the pixel PX does not emit light for ¼ of one frame 1FT such that it is possible to prevent an unclear image or a blurring phenomenon.

Next, an exemplary embodiment of an OLED display according to the present invention will be described with reference to FIG. 12.

Figure 12:
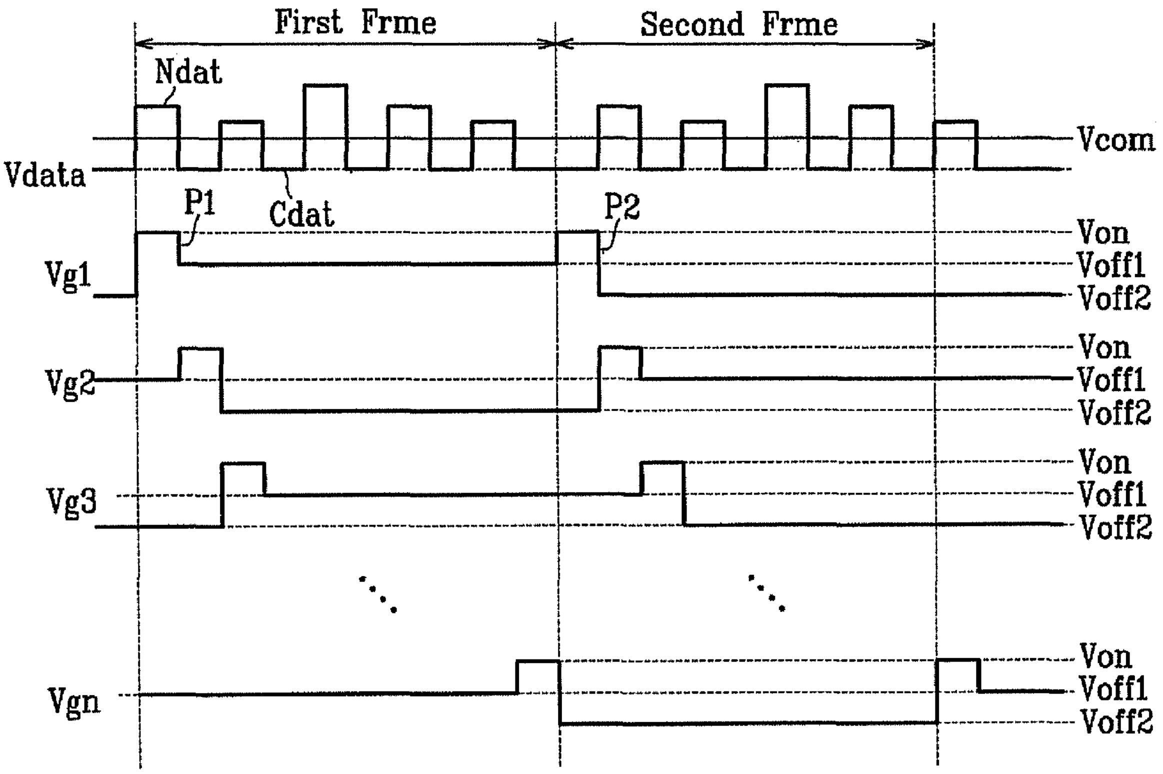
FIG. 12 is a signal waveform diagram showing operations of another exemplary embodiment of an OLED display according to the present invention.

FIG. 12 is a signal waveform diagram showing operations of another exemplary embodiment of an OLED display according to the further exemplary embodiment of the present invention. An OLED display according to the further exemplary embodiment of the present invention is based on an OLED display employed the scanning driver 400' shown in FIG. 9, and thereby detailed descriptions of units having the same functions are omitted.

According to the current exemplary embodiment, the signal controller 600 arbitrarily divides a plurality of pixel rows of the display panel 300 into a plurality of pixel row groups. The number of pixel rows included in a pixel row group may be varied if necessary, and in the current exemplary embodiment of the present invention, the number of the pixel rows included in one pixel row group is 1.

The data driver 500 is supplied with digital image data DAT having normal image data and compensating image data from the signal controller 600. Then, the data driver 500 selects one of the normal image data and the compensating image data to apply the different kind of data voltages to two adjacent pixel row groups, respectively. That is, the data driver 500 applies the normal data voltages Ndat corresponding to the normal image data to one pixel row group and applies the compensating data voltages Cdat corresponding to the compensating image data to another adjacent pixel row group.

The signal controller 600 controls the state of a selection signal to the data driver 500 such that the kind of data voltages Vdata applied to the same pixel row group is changed every predetermined number of frames.

Thereby, as shown in FIG. 12, the type of data voltages Vdata, either Ndat or Cdat, applied to the odd pixel rows and the even pixel rows, respectively, is different from each other. For example, in a first frame, a first pulse signal P1 is applied to the odd pixel rows such that the normal data voltages Ndat are applied for about 1H, and a second pulse signal P2 is applied to the even pixel rows such that the compensating data voltages Cdat are applied for about 1H. In a second frame, the second pulse signal P2 is applied to the odd pixel rows such that the normal data voltages Ndat are applied for about 1H, and the first pulse signal P1 is applied to the even pixel rows such that the compensating data voltages Cdat are applied for about 1H.

Therefore, images that correspond to the normal data voltages Ndat are displayed in the odd pixel rows, and black color images that correspond to the compensating data voltages Cdat are displayed in the even pixel rows, Accordingly, as described above, for one frame, driving transistors Qd in the odd or even pixel rows are turned off by the compensating data voltages Cdat such that a variation of a threshold voltage of the driving transistor Qd is reduced.

When another exemplary embodiment of an OLED display according to the present invention employs the scanning driver 400 shown in FIG. 5, the data driver 500 alternately applies the normal data voltages Ndat and the compensating data voltages Cdat to the data signals $D_1$-$D_m$ using a selection signal, and the scanning driver 400 alternately selects one of the first and second pulse signals P1 and P2 from the first and second level shifters 450 and 460 corresponding to the normal data voltages Ndat and the compensating data voltages Cdat to output as scanning signals.

For example, when the normal data voltages Ndat are applied to the odd pixel rows, the data driver 500 selects output signals from the first level shifter 450 to output them to odd scanning lines $G_1$, $G_3$, $G_5$ . . . , and when the compensating data voltages Cdat are applied to the even pixel rows, the data driver 500 selects output signals from the second level shifter 460 to output them to even scanning lines $G_2$, $G_4$, . . . .

In the current exemplary embodiment, since the normal data voltages and the compensating data voltages are applied for about 1H, respectively, an input frame frequency and an output frame frequency are the same. One benefit of such an exemplary embodiment is that a separate memory, etc., for frequency conversion is unnecessary.

A variation of a screen for displaying images by the operation of the OLED display will be described with reference to FIG. 13.

Figure 13:
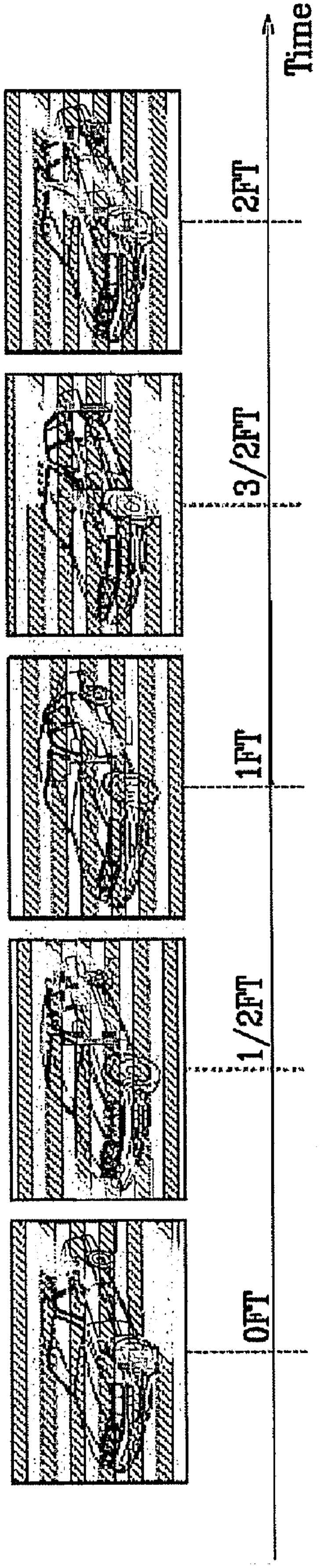
FIG. 13 is a schematic view showing a screen of the exemplary embodiment of an OLED display on which an image is displayed according to the driving signals shown in FIG. 12.

FIG. 13 is a schematic view showing a screen of the exemplary embodiment of an OLED display on which an image is displayed according to the driving signals shown in FIG. 12.

Referring to FIG. 13, black images corresponding to the compensating data voltages Cdat are displayed in the odd pixel rows, and images corresponding to the normal data voltages of the previous frame Ndat are displayed in the even pixel rows at the initial time of one frame.

When a first frame starts, images corresponding to the normal data voltages Ndat of the first frame are sequentially displayed in the odd pixel rows, and black images corresponding to the compensating data voltages Cdat are sequentially displayed in the even pixel rows.

Thereby, when the first frame ends, the odd pixel rows of the entire screen display the images.

Next, when a second frame starts, black images corresponding to the compensating data voltages Cdat are sequentially displayed in the odd pixel rows, and images corresponding to the normal data voltages Ndat are sequentially displayed in the even pixel rows.

A pixel PX emits light in response to the application of normal data voltages Ndat until compensating data voltages Cdat are applied. The same pixel PX does not emit light again until normal data voltages Ndat of the next frame are applied.

According to the present invention, by application of a reverse voltage to a driving transistor, a variation of a threshold voltage of the driving transistor is reduced or effectively prevented.

In addition, when the reverse voltage is applied to the driving transistor, a voltage of a control terminal of a switching transistor decreases to reduce a leakage current flowing through the switching transistor.

Furthermore, a black color image is displayed for a predetermined time such that a blurring phenomenon, etc., decreases to improve image quality.

While the present invention has been described in connection with what is presently considered to be practical exemplary embodiments, it is to be understood that the present invention is not limited to the disclosed embodiments, but, on the contrary, is intended to cover various modifications and equivalent arrangements included within the spirit and scope of the appended claims.

What is claimed is:

1. A display device comprising:

a plurality of scanning lines;

a plurality of data lines intersecting the scanning lines;

a plurality of pixels each of which comprises a switching transistor connected to one of the plurality of scanning lines and one of the plurality of data lines, a driving transistor connected to the switching transistor, and an OLED connected to the driving transistor;

a data driver which applies data voltages to the data lines; and a scanning driver which applies scanning signals, each having at least three different voltage levels, to the scanning line, wherein the scanning signals comprise a turn-on voltage level which turns on the switching transistor and at least two turn-off voltage levels which turn off the switching transistor, the at least two turn-off voltage levels being different from each other, wherein the data voltages comprise a normal data voltage representing a grayscale and a reverse bias voltage which applies a reverse bias to the driving transistor to display black regardless of the grayscale, and wherein the two turn-off voltage levels comprise a first turn-off voltage level being applied after the normal data voltage is applied and a second turn-off voltage level being applied after the reverse bias voltage is applied.

2. The display device of claim 1, wherein the second turn-off voltage level has a lower voltage than the first turn-off voltage level.

3. The display device of claim 2, wherein the scanning driver comprises:

a shift register for sequentially outputting output signals responsive to a scanning start signal and a clock signal;

first and second level shifters supplied with the output signals from the shift register; and an output unit for selectively outputting one of the turn-on voltage, the first turn-off voltage, and the second turn-off voltage from the first level shifter and the second level shifter, wherein at least one of the first level shifter and the second level shifter outputs the turn-on voltage, the first level shifter outputs the first turn-off voltage, and the second level shifter outputs the second turn-off voltage.

4. The display device of claim 3, wherein the output unit outputs the turn-on voltage and the first turn-off voltage output by the first level shifter to correspond to the normal data voltage and outputs the turn-on voltage and the second turn-off voltage of the second level shifter to correspond to the reverse bias voltage.

5. The display device of claim 1, wherein the reverse bias voltage is lower than the normal data voltage.

6. The display device of claim 1, wherein the data driver outputs the normal data voltage and the reverse bias voltage within one frame.

7. The display device of claim 1, wherein the data driver outputs the reverse bias voltage within one frame of a plurality of frames.

8. The display device of claim 1, wherein the data driver alternately applies the normal data voltage and the reveres bias voltage to the data lines, and the scanning driver applies the turn-on voltage level to the scanning lines at a different predetermined time.

9. The display device of claim 1, wherein the pixels comprise a first pixel row group supplied with the normal data voltage and a second pixel row group supplied with the reverse bias data voltage.

10. The display device of claim 9, wherein the normal data voltage and the reverse bias voltage are alternately applied to the first pixel row group and the second pixel row group every frame.

11. The display device of claim 10, wherein the first pixel row group comprises odd pixel rows and the second pixel row group comprises even pixel rows.

12. A display device comprising:

a plurality of scanning lines;

a plurality of data lines intersecting the scanning lines;

a plurality of pixels each of which comprises a switching transistor connected to one of the plurality of scanning lines and one of the plurality of data lines, a driving transistor connected to the switching transistor, and an OLED connected to the driving transistor;

a data driver which alternately applies a normal data voltage representing a grayscale and a reverse bias voltage, which applies a reverse bias to the driving transistor to display black regardless of the grayscale, to the data lines; and a scanning driver which applies scanning signals to the scanning lines, wherein the normal data voltage and the reverse bias voltage are applied to each pixel at a different predetermined time, wherein the scanning driver applies a first turn-off voltage after the normal data voltage is applied and applies a second turn-off voltage after the reverse bias voltage is applied, the first and second turn-off voltages being different from each other.

13. The display device of claim 12, wherein the second turn-off voltage has a level that is lower than a level of the first turn-off voltage.

14. The display device of claim 12, wherein the scanning driver comprises:

a first shift register which sequentially outputs a first output signal responsive to a first scanning start signal;

a second shift register which sequentially outputs a second output signal responsive to a second scanning start signal;

first and second level shifters which are supplied with the first and second output signals from the first and second shift registers, respectively; and an output unit which selectively outputs one of the turn-on voltage, the first turn-off voltage, and the second turn-off voltage from the first level shifter and the second level shifter, wherein at least one of the first level shifter and the second level shifter outputs the turn-on voltage, the first level shifter outputs the first turn-off voltage, and the second level shifter outputs the second turn-off voltage.

15. The display device of claim 12, wherein the data driver applies the normal data voltage and the reveres bias voltage to the data lines about every horizontal period, wherein a horizontal period is equal to a period of a horizontal synchronization signal and a data enable signal.

16. The display device of claim 12, wherein the different predetermined time is less than about one horizontal period, wherein a horizontal period is equal to a period of a horizontal synchronization signal and a data enable signal.

17. The display device of claim 12, wherein a time from the application of the normal data voltage to the application of the reverse bias voltage is longer than a time from the application of the reveres bias voltage to the application of another normal data voltage.

18. The display device of claim 12, wherein the plurality of pixels is arranged in substantially a matrix shape having rows and columns and the normal data voltage is sequentially applied to every pixel row and the reverse bias voltage is sequentially applied to every pixel row.

19. The display device of claim 12, wherein the plurality of pixels is arranged in substantially a matrix shape having rows and columns and the normal data voltage and the reverse bias voltage are alternately applied to the odd pixel rows and the even pixel rows.

20. A driving method of a display device comprising a plurality of scanning lines, a plurality of data lines, switching transistors connected to the data lines, driving transistors connected to the switching transistors, and OLEDs connected to the driving transistors, the method comprising:

applying normal data voltages to the data lines, the normal data voltage representing a grayscale;

applying a first turn-on voltage and a first turn-off voltage to the scanning lines;

applying reverse bias voltages to the data lines, the reverse bias voltage applying a reverse bias to the driving transistor to display black regardless of the grayscale; and applying a second turn-on voltage and a second turn-off voltage to the scanning lines, wherein the first turn-off voltage is applied after the normal data voltage is applied, and the second turn-off voltage is applied after the reverse bias voltage is applied, the first and second turn-off voltages being different from each other.

21. The driving method of claim 20, wherein the second turn-off voltage has a voltage level that is lower than a voltage level of the first turn-off voltage.

22. A driving method of a display device comprising a plurality of pixel rows, a plurality of scanning lines, a plurality of data lines, switching transistors connected to the data lines, driving transistors connected to the switching transistors, and OLEDs connected to the driving transistors, the method comprising:

alternately applying a normal data voltage representing a grayscale and a reverse bias voltage applying a reverse bias to the driving transistor to display black regardless of the grayscale to the data lines;

applying turn-on voltages to the scanning lines, the turn on voltages being supplied to each scanning line at a different predetermined time; and applying a first turn-off voltage to the scanning line after the normal data voltage is applied; and applying a second turn-off voltage to the scanning line after the reverse bias voltage is applied, the first and second turn-off voltages being different from each other, wherein the turn-on voltages are applied when the normal data voltage and the reverse bias voltage are applied, and an entire frame is displayed every time that a normal data voltage and a reverse bias voltage are applied to all of the data lines.

23. The driving method of claim 22, wherein the second turn-off voltage has a voltage level that is lower than a voltage level of the first turn-off voltage.

24. The driving method of claim 22, further comprising alternately applying the normal data voltages and the reverse bias voltages to odd pixel rows and even pixel rows every frame, respectively.

* * * * *